United States Patent
Lee et al.

[11] Patent Number: 5,996,073
[45] Date of Patent: Nov. 30, 1999

[54] SYSTEM AND METHOD FOR DETERMINING COMPUTER APPLICATION STATE

[75] Inventors: Cadir Batista Lee, Sunnyvale; Scott William Dale, Palo Alto, both of Calif.

[73] Assignee: Tioga Systems, Inc., Palo Alto, Calif.

[21] Appl. No.: 08/993,103

[22] Filed: Dec. 18, 1997

[51] Int. Cl.$^6$ .................................................. G06F 9/445
[52] U.S. Cl. ............................ 713/1; 713/100; 710/104
[58] Field of Search ................................ 395/651, 700, 395/500, 703, 158, 712, 200.33, 672; 345/348; 358/112; 370/85.4; 713/1, 2, 100; 710/104; 709/3

[56] References Cited

U.S. PATENT DOCUMENTS

| | | | |
|---|---|---|---|
| 4,023,729 | 5/1977 | Eaton | 235/53 |
| 4,053,871 | 10/1977 | Vidalin et al. | 340/146.2 |
| 4,536,791 | 8/1985 | Campbell et al. | 358/122 |
| 5,101,436 | 3/1992 | Deaguiar et al. | 382/1 |
| 5,247,683 | 9/1993 | Holmes et al. | 395/700 |
| 5,283,864 | 2/1994 | Knowlton | 395/158 |
| 5,291,490 | 3/1994 | Conti et al. | 370/85.4 |
| 5,499,357 | 3/1996 | Sonty et al. | 395/500 |
| 5,581,764 | 12/1996 | Fitzgerald et al. | 395/703 |
| 5,666,501 | 9/1997 | Jones et al. | 345/348 |
| 5,721,824 | 2/1998 | Taylor | 395/200.33 |
| 5,752,042 | 5/1998 | Cole et al. | 395/712 |
| 5,828,878 | 10/1998 | Bennett | 395/672 |
| 5,835,777 | 11/1998 | Staelin | 395/712 |

OTHER PUBLICATIONS

Randy Kath, "The Portable Executable File Format from T Bottom," Microsoft article from http://microsoft.com/win32dev/base/pefile.htm, 1997.

*Primary Examiner*—Joseph E. Palys
*Assistant Examiner*—Rijue Mai
*Attorney, Agent, or Firm*—Fish & Richardson P.C.

[57] ABSTRACT

A computer implemented system analyzes an application state by determining entities which provide predetermined functionalities for a user, determining items that depend from the determined entities, grouping entities by pruning overlapping entities and combining similar entities, and packaging the group of entities using a predetermined format. The system provides automatic relationship resolution based on a current machine state to enumerate in a deterministic manner fundamental data, metadata and dependencies necessary for correct application function. In addition, state information is stored in a persistent format to be used in a variety of applications, including installation, synchronization, backup, recovery, analysis, and repair.

20 Claims, 11 Drawing Sheets

SYSTEM AND METHOD FOR DETERMINING COMPUTER APPLICATION STATE

BACKGROUND

Historically, software applications were typically batch-processed on a mainframe at a centralized computing center. More recently, the availability of inexpensive, yet powerful personal computers has displaced the batch-processing mode of the past. The availability of a wide range of user-friendly, productivity enhancement software has made personal computing ubiquitous. Although more easily customized to users' specific requirements, the proliferation of personal computers is making the job of managing large scale computing more difficult. In the past, the mainframe in the computing center performed centralized system management tasks, including library and configuration management and software version control, among others. However, in a modem network with diverse processors, peripherals, and software applications, the range of possible configurations is staggering.

Some of the configuration information is hardware specific, such as disk controller port addresses, communication port addresses and video port addresses. Further, software specific configuration parameters may be set within configuration files for each application. For example, a configuration file stored within an IBM-compatible personal computer known as an autoexec.bat file may include path statements. Additionally, specific application software may require specific initialization information to run effectively. Typically, this information may be set in an initialization (.ini) file.

Once installed, the computer configuration does not remain static, however. The user may update configurable preferences while operating the software, such as updating file open/save paths. Additionally, the user may "personalize" the software by adding new information such as bookmark data in the case of World-Wide-Web browser software, for example. Moreover, due to the constant competitive pressure to build a better product, by the time a software release is delivered to the user, software developers are already working on the next release. To cope with rising demands on friendlier and more functional applications, software developers have increasingly adopted a component model where an application is reduced into a plurality of modules or components. Modifications may be made to a single component to enhance its performance or implement new features not previously available without compromising the status of the remaining components. In this paradigm, a software application is a collection of many separate files, each of which may be generated by unrelated software developers who may be more aware of each component's integrity than the integrity of the assembled package. Although software reuse is promoted, the paradigm necessitates a higher level of inter-component integrity. Not surprisingly, although more frequent updates bring more functional software to users, the complexity of managing the release installation increases disproportionally with the number of changes.

Historically, relationships between components have been manually detected and component states recorded in a log. This information is external of the components themselves and must be updated whenever the components change. As state information is recorded only at the time of development, changes made subsequent to the time of development may be lost. As the pace of changes increases and complexity of the software assembly process grows, the external representation of the correct state relationship between components becomes prone to error.

Moreover, during use, users may personalize the software and thus change the state information. The difference in state information between software installation and software operation leads to an unpredictable operation and may require more support from information system (IS) personnel.

Maintenance of the current states of software applications in commercial operations is needed in a variety of applications, including software installation, synchronization, backup, recovery, analysis and repair. A detailed knowledge of a computer's dynamic environment and its system configuration is needed to prevent situations where modifications to one component to correct one problem may introduce other errors if improperly installed. Moreover, an accurate knowledge of system configuration is required in order to verify compatibility and to ensure integrity across multiple operating environments and across diverse processors.

SUMMARY

The present invention determines an application state by determining entities which provide predetermined functionalities for a user, determining items that depend from the determined entities, grouping entities by pruning overlapping entities and combining similar entities, and packaging the group of entities using a predetermined format. The system provides automatic relationship resolution based on a current machine state to enumerate in a deterministic manner fundamental data, metadata and dependencies necessary for correct application function. A complete, persistent run-time state information about the application is generated which may be used in installation, synchronization, backup, recovery, analysis and repair of a computer system.

In one aspect, the entities are analyzed by determining tiers of user accessibility. Further, for each tier, root entities are enumerated based on predetermined criteria. For each enumerated entity, one or more dependencies of the entity are determined.

In another aspect, the item dependency is determined by generating one or more candidates, analyzing the candidates, confirming the candidates, and packaging items associated with the candidate.

In yet another aspect, the entity grouping and packaging is accomplished by determining an inter-entity relationship, processing the entities based on the inter-entity relationship, and placing the entities into a predetermined format.

In another aspect, the format contains detailed information about each item and each entity. The format has zero or one information block and one or more entity blocks. Multiple information blocks with their associated entity blocks may be grouped together.

Advantages of the present invention include the following. The invention dynamically rebuilds an external representation of correct state from the components themselves. Moreover, because the state construction process is dynamic, the invention can follow software through its entire life cycle and provide information for many management tasks that need detailed information about the application during execution.

DESCRIPTION

As used herein, a candidate is a data packet containing information used to generate one or more items. An item relates to a fundamental unit of data or metadata that may be operated upon with or without dependencies from other items. An entity is a group of items. The entity represents a set of predetermined functionality for a computer system or for a user. In its simplest form, the entity may represent a single application such as Corel WordPerfect, Microsoft Excel, among others. The entity may also include information on one or more operating system settings such as printer settings, font settings, network device settings, among others. Moreover, the entity may also include information on files such as data files, initialization files, source files, and templates, among others. Each entity has a state which is a logical subset of the entire functionality available in the computer system. The system state may include information on executable files such as .exe files, .dll files and .ocx files. The machine state may also include registry settings, environment variables, support files, and data files at particular points in time.

Figure 1:
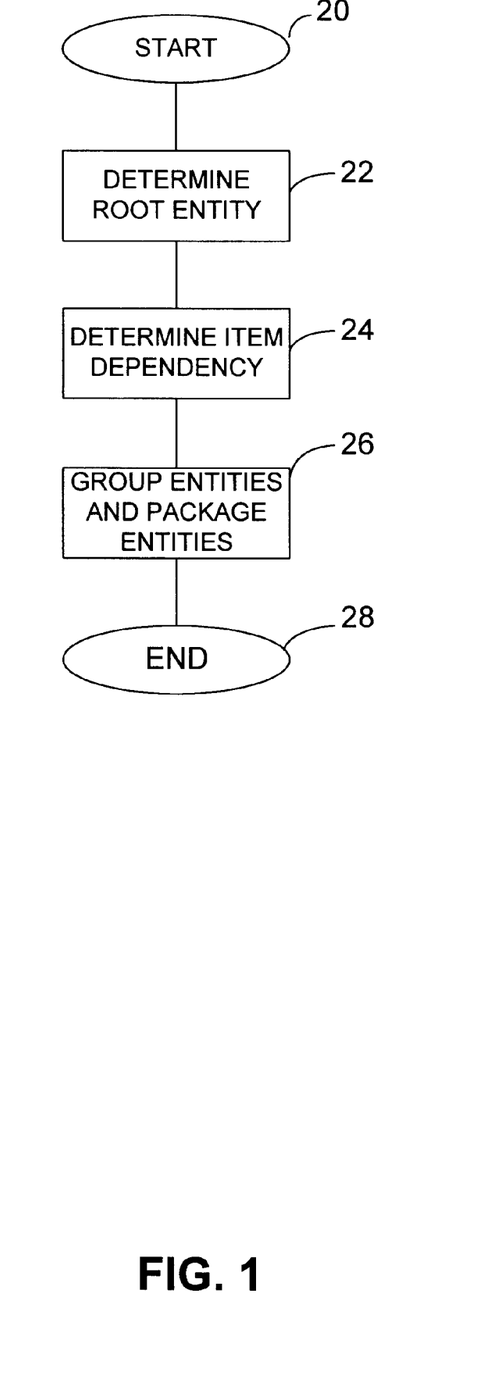
FIG. 1 is a flowchart of a process to analyze run time states of application software.

Referring now to the figures, FIG. 1 is a flowchart illustrating a process for determining a run-time state of a software application. In FIG. 1, the process initially determines the existence of one or more entities relating to a predetermined set of functionalities for a user (step 22). As the entity describes all useful functionality for the user, the root entity therefore represents an objective that may be performed in a completely self-sufficient manner by the user at another machine or at another place or at another time.

Next, the process determines item dependencies, which may change over time step 24. The determination of the item dependencies is also a complete and deterministic process to locate all dependencies and to generate a finite set of dependencies. The process groups entities into a set by deleting overlapping entities and combining similar entities. Moreover, the state generation for an unchanged item will be consistent and identical to all previous state generations, provided that no changes have been made to any dependencies of the item. Finally, the process packages the entities into a suitable format for subsequent use (step 26) before exiting (step 28). In the grouping of entities in step 26, an intersection of the entities is determined such that a package of entities can be succinctly defined and that all the information necessary for it can be represented in a file with or without the actual entities. Enough information about each entity is included so that an analysis of correctness may be performed.

Figure 2:
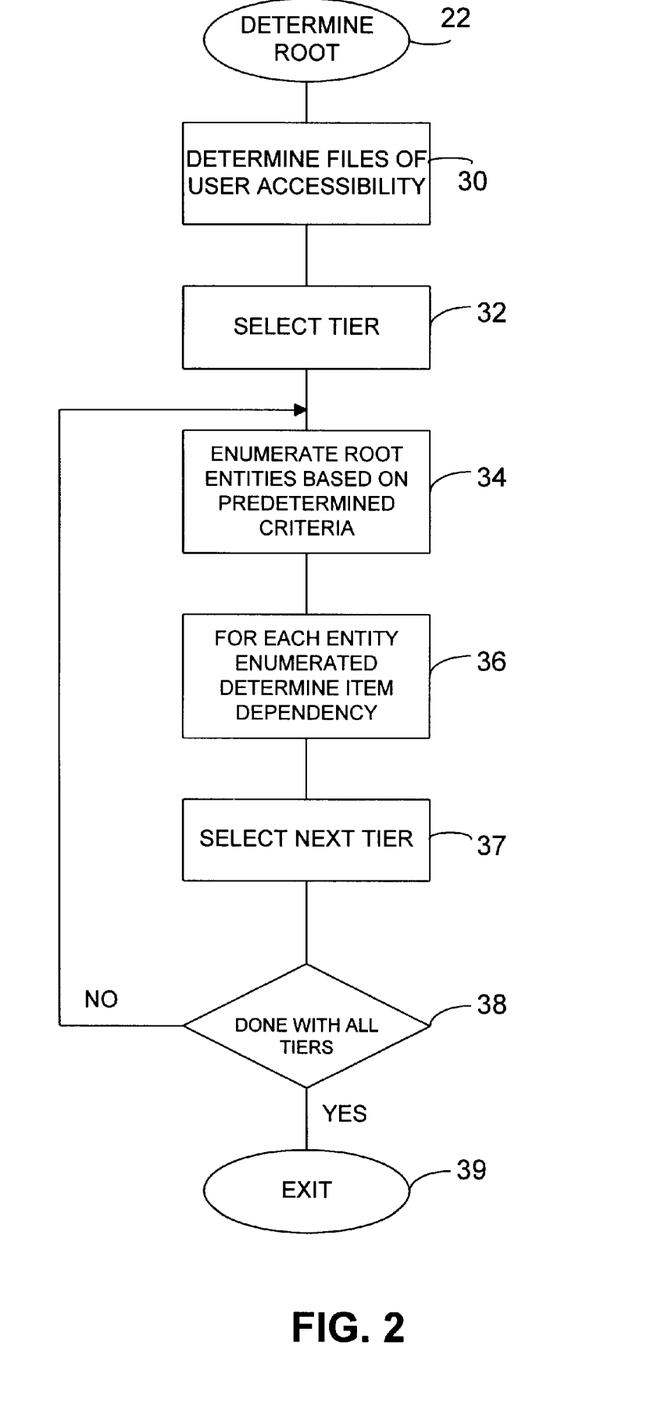
FIG. 2 is a process of a flowchart to determine root entities.

Referring now to FIG. 2, step 22 (FIG. 1) is shown in more detail. In FIG. 2, one or more tiers of user accessibility are determined (step 30). The determination of the tiers is based in part on an ease of user accessibility to the application. A tier is selected based on its priority in a processing queue (step 32). Typically, the highest priority tier remaining in the queue is selected. For the selected tier, one or more root entities are enumerated, based on predetermined criteria (step 34). The predetermined criteria may relate to the status of the entity and its perceived usefulness to the user, for example. The tier information, which is operating system dependent, shows the entities that might be in that tier. Additionally, as the enumeration of the entities is based on whether the entities have already been processed or excluded, a record is kept of the processed entities to track situations where entities may be included in multiple tiers or cross tiers.

For each of the entities enumerated in step 34, item dependencies are determined (step 36). This step translates the data found in a tier to an actual item, be it an executable file or a data file. The step is also a translation of the entity to a root item. An example would include a translation from a link file to an executable file or from a data file to the executable file that accesses the data file. Determinations of all the dependencies that make up that entity are then generated. Some items, for example data files, may be end points as they have no further dependencies. Other items, such as executable files, may have many dependencies that may be generated from that item. For the selection of the next tier, there may be a conditional determination that a predetermined threshold of entities have already been located and, upon reaching this threshold, the processing of the current tier may be stopped.

Once all enumerated entities of the current tier have been analyzed, the process selects the next tier for processing (step 37). The process then determines whether it has completed processing all tiers. If not, the process loops from step 38 back to step 34 to continue processing. Otherwise, the process exits (step 39).

Figure 3:
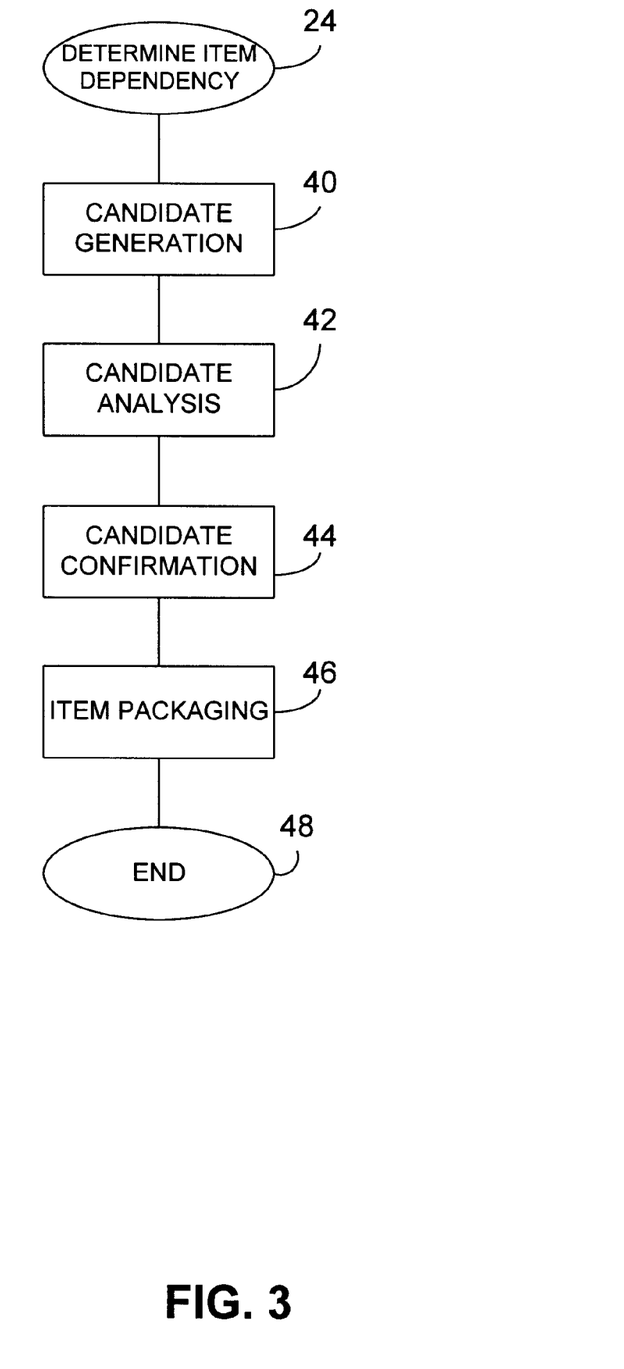
FIG. 3 is a flowchart of a process to determine item dependencies.

Referring now to FIG. 3, step 24 (FIG. 1) is shown in more detail. In determining the item dependency, the process first generates one or more candidates (step 40). The candidate generation process is largely dependent on a binary analysis of the root item currently being examined. The candidates may be generated by analyzing strings found in an executable file. Each string may represent a candidate. However, the generated candidates may be invalid. For instance, they may be names of files, they may be pointers or references to metadata or they may be garbage information from the standpoint of dependencies between the current entity and other items on the system. Hence, the generated candidates are pruned (step 42) by deleting candidates that do not reference other valid items on the system or candidates with redundant relationships between items that have already been established. Next, the candidates are confirmed (step 44). In step 44, those items passing through the candidate analysis that are deemed important are confirmed so that a link is actually made between the candidate and its parent item. The link may be a reference to metadata, a reference to a file, or may be a reference to an external piece of information needed by the application. The links are confirmed and if that confirmation is successful, they are then passed on to become items that go through the process of dependency generation. In the analysis and confirmation of the candidates, the process accesses and references a stored pool of other candidates and items which the current candidate will be compared against.

In step 46, the resultant items from the analysis and confirmation are packaged (step 46). The packaging process records information necessary to identify a particular item belonging to an entity. The information is sufficient for another application to determine salient characteristics about that item without actually having to investigate the item. In addition to a file name, file size information, cross-check information that identify the file and the file version is added after the item has been confirmed in the item packaging. For each item that is packaged, step 46 is repeated to locate items that are below the current item in a dependency tree. For each item beneath the current item, the process continues recursively until an atomic level item is found that can undergo no further candidate generation. At that point, the process exits (step 48).

Figure 4:
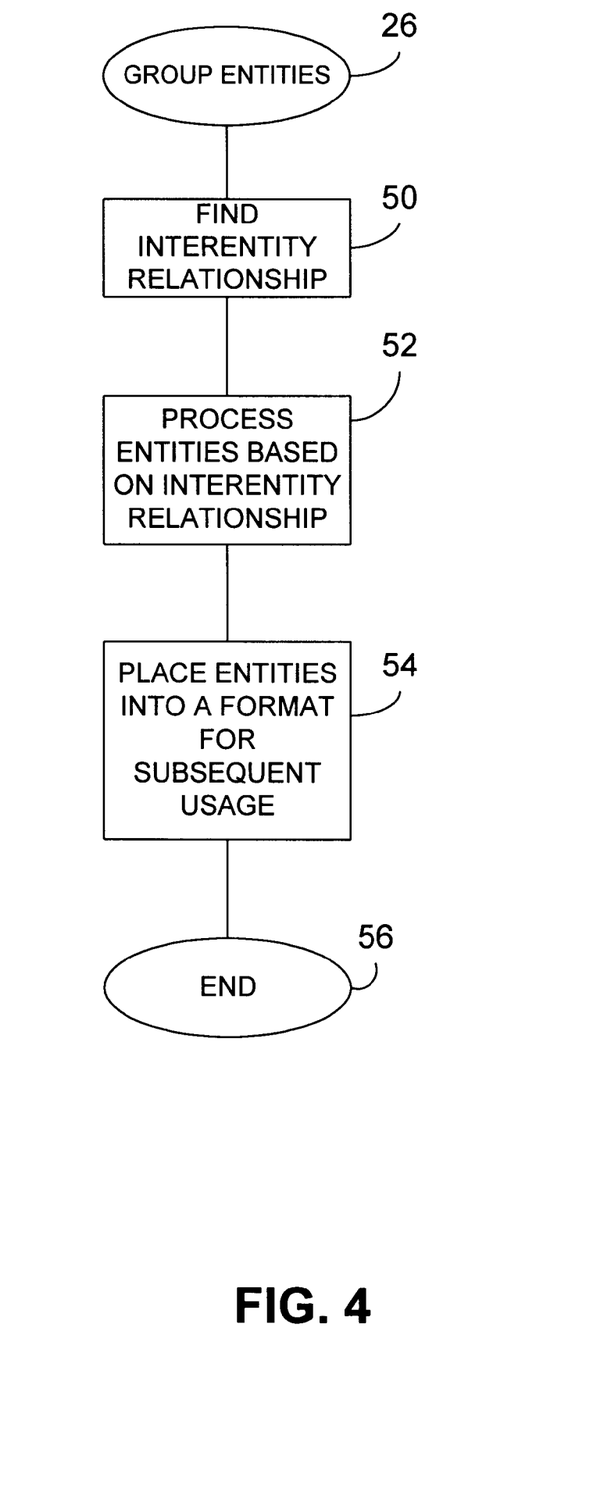
FIG. 4 is a flowchart of a process to determine group and to package entities.

FIG. 4 shows in more detail the process 26 (FIG. 1) to group entities and to package the entities. Step 26 initially determines an inter-entity relationship (step 50) by determining an intersection between entities or collections of entities. This process places the entity into a relationship with other entities at a current processing level. Once the relationships are found, related entities may be grouped together, possibly formed into one entity, or alternatively, entities may be marked for deletion if the entities are redundant. The entities are then processed based on the determined inter-entity relationship (step 52). In one aspect, the entities are processed according to their dependencies and relationships on operating system or higher level requirements. For example, the requirement of a specific version of an operating system, specific hardware that the entity uses, specific file size requirements in terms of disk space, or other such dependencies at that point are processed. Finally, the entities are placed into a suitably formatted file for subsequent usage (step 54). Moreover, information on files that need to be packaged with the entity or for information to be further enumerated are gathered and placed into the formatted file. The formatted file is thus a collection of fundamental items which represent atomic data or metadata that may be operated on individually. Preferably, the format is an extensible format for representing a useful subset of application functionality. Items are typed and include enough information about the type for comparative decision to be made without further searches. In addition to capturing item information, the format provides for an increasing hierarchy of information to group items logically and to provide additional information such as dependencies, descriptions, and administrative overhead. From step 54, the process of FIG. 4 exits (step 56).

Figure 5:
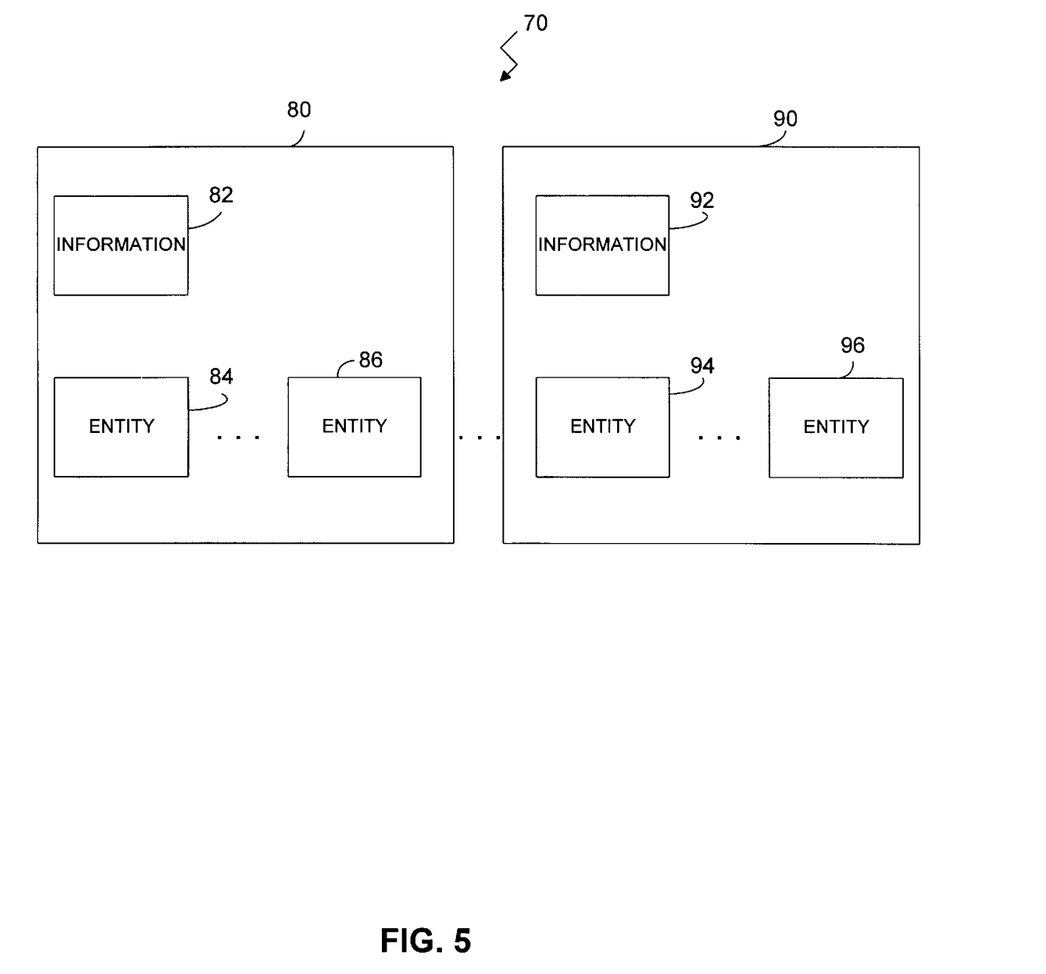
FIG. 5 is a block diagram of a format in characterizing the application software.

A graphical example of a hierarchical format 70 is shown in FIG. 5. The format 70 stores a persistent state for entity groups 80 and 90. The entity group 80 has zero or one information blocks 82. The entity group 80 is a collection of related entities that all share similar entity level description dependencies as described in the information block 82. The entity 80 also has one or more entity blocks 84–86. The entity blocks 84 through 86 are collections of items which were created during the item generation step 24 (FIG. 3). The entity blocks 84–86 are related in a predetermined way. For example, they may have related executables or a set of related document files of different types. Similarly, the entity 90 has zero or one information blocks 92 and one or more entity blocks 94–96. The format may be text based, binary based, compressed, and/or encrypted. An embodiment of the format may be as follows:

---

[INFO "entity set label"]
key=value
key2=value2
  |
[ENT "entity block label"]
itemtype = value1, value2, value3, value4, . . . itemtype2 = v2, v3, v4 . . .
. . .

---

In this embodiment, blocks are represented with brackets and a block type and a block label. An arbitrary number of line separated key value pairs follows each block. If the key is recognized as an item type, an expected number of values is required on the same line depending on the item type. Three block types, INFO, ENT, DEP are used. The INFO block type contains general information about the entity set and descriptive information about the entire file. The ENT block type contains a collection of other entities and/or items, and the DEP block type contains dependencies which are represented as key=value pairs. Moreover, five or more item types: file, pefile, reg, ini, lnk, are basic types which may be used. The file type relates to any file on the system. The pefile type relates to executable files in a Portable Executable format. The reg type relates to metadata representing an entry in a Windows Registry. The ini type relates to metadata representing an entry in an ini style support file, and the lnk type relates to a binary metadata file representing a shortcut to another file. Other types may describe additional data or metadata.

Figure 6:
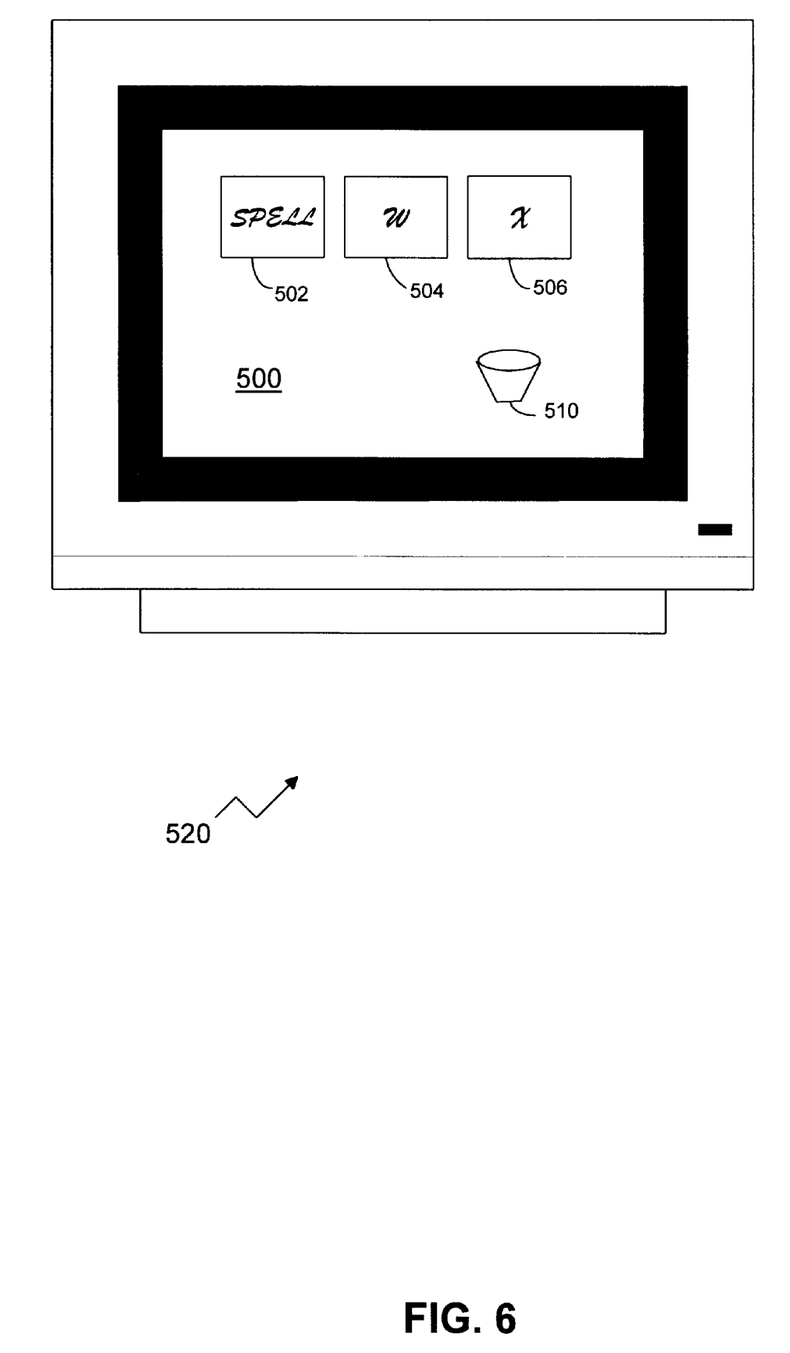
FIG. 6 is an exemplary illustration of a desktop configuration.

Turning now to FIG. 6, an exemplary desktop configuration is shown. In FIG. 6, a desktop 500 contains a spell check application 502, a word processing application 504 and a spreadsheet application 506. Additionally, a trash can 510 is shown on the desktop 500. The desktop 500 appears as one of the tiers when determining the root entities as in step 22. In that tier, the process enumerates through the spell check application 502, the word processing application 504, the spreadsheet application 506, and the trash can 510. The process discards the trash can 510, but the rest are treated as entities and item dependencies are determined. An item dependency list is generated for each of the applications 502–506. The desktop is then encoded as an entity in the predetermined format for subsequent use in installation or maintenance of the software for the user.

In performing the process of FIG. 1, the system determines that the spell checker and the word processing applications 502 and 504 are similar in type and have similar dependencies. Thus, they are entered into an information block that indicates that the applications may be reliant on a common dictionary or a thesaurus. Further, applications 502 and 504 may share one or more operating system requirements. Hence, an information block 82 is generated for the entities 502–504. Thus, an entity group would be created consisting of one information block (82) and two entity blocks (84–86) each representing one of the two applications (502–504). Moreover, the entire entity group (80) may have similarity with the spreadsheet application 506 in that they reside in a similar location or are accessible through a similar path such that they constitute a suite or a group of related entities. As such, the applications 502–506 may be packaged together to create a larger entity group. The final package would then consist of an entity group (80) containing the applications (502–504) and another entity group (90) containing the application (506). The package contains state information suitable for a variety of applications, including installation, synchronization, backup, recovery, analysis, and repair of the computer.

Figure 7:
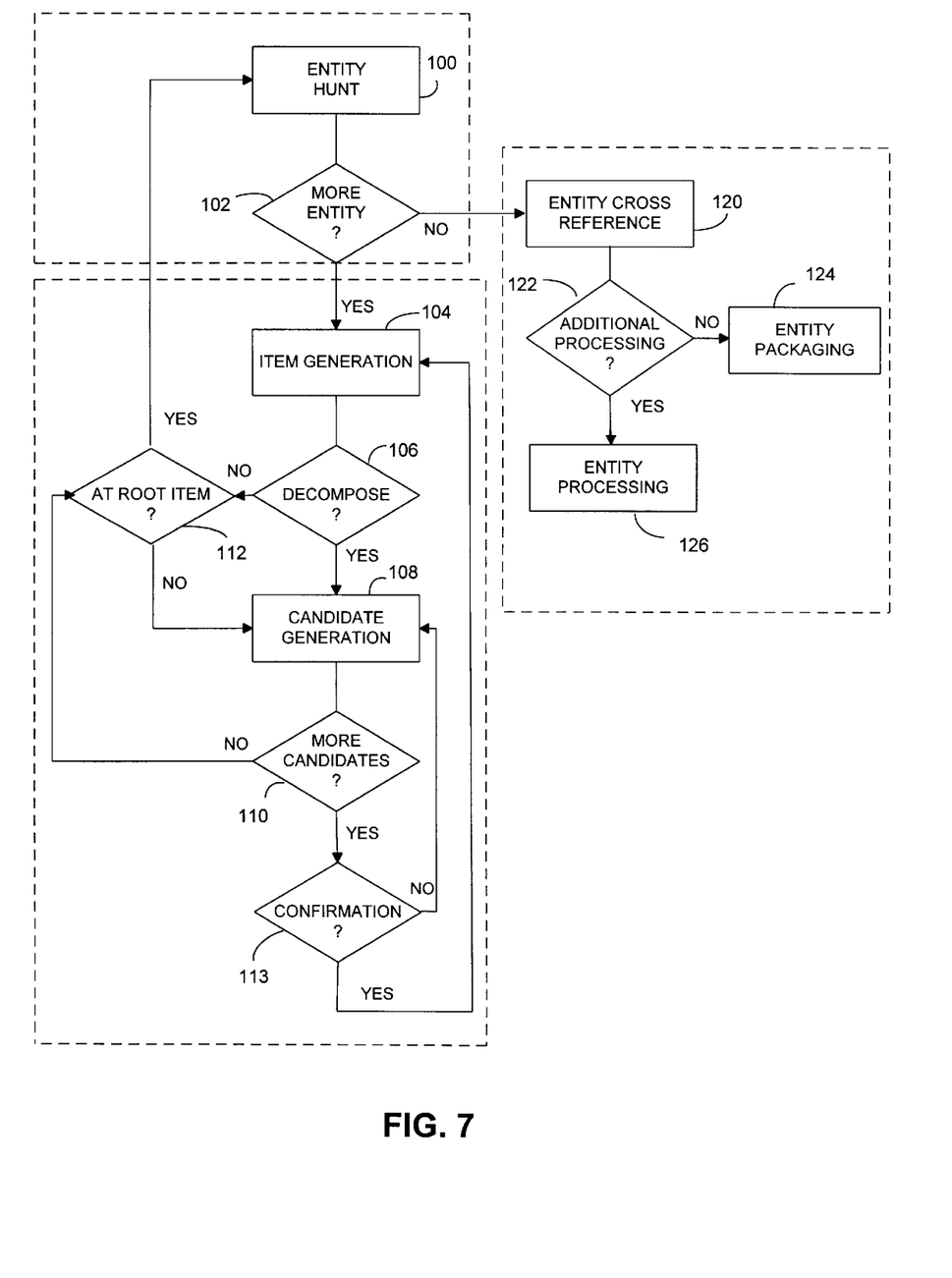
FIG. 7 is a flowchart of a process for analyzing, describing, and replicating logical entities on a computer executing an operating system such as a Microsoft Windows operating system.

Referring now to FIGS. 7–10, an embodiment of the present invention running on a Microsoft Windows operating system is illustrated. FIG. 7 shows a process 99 to analyze, describe, and replicate logical entities on a computer. Initially, the process 99 hunts for one or more entities (step 100). After finding entities on the computer system, the process 99 checks whether it has completed processing of all entities (step 102). If one or more entities remain to be processed, the process 99 generates an item (step 104). Next, the process 99 checks whether the item is to be decomposed (step 106). If so, the process 99 generates one or more candidates (step 108). The process 99 then checks whether additional candidates are to be processed (step 110). If so, the process 99 further checks if the candidates are to be confirmed (step 113). If confirmation is not to be performed, the process 99 loops back to step 108 to continue generating candidates. Alternatively, in step 113, if confirmation is to be performed, the process 99 loops back to step 104 to continue the item generation process.

From step 106 or step 110, in the event that the item is not to be decomposed or that candidates are not to be generated, the process 99 proceeds to step 112 where it checks whether it is at a root item. If not, the process 99 proceeds from step 112 to step 108 to continue the candidate generation process. Alternatively, in the event that the process 99 is at a root item, the routine operates on the next tier in the entity hunt process 99.

From step 102, in the event that all entities have been analyzed, the process 99 proceeds to step 120 to cross-reference the entities previously determined in steps 104–113. The process 99 determines whether additional overhead processing on the entities is to be performed (step 122). If not, the entity is packaged using the suitable format discussed earlier in step 124. Alternatively, additional processing of the entity may be done in step 126.

Figure 8:
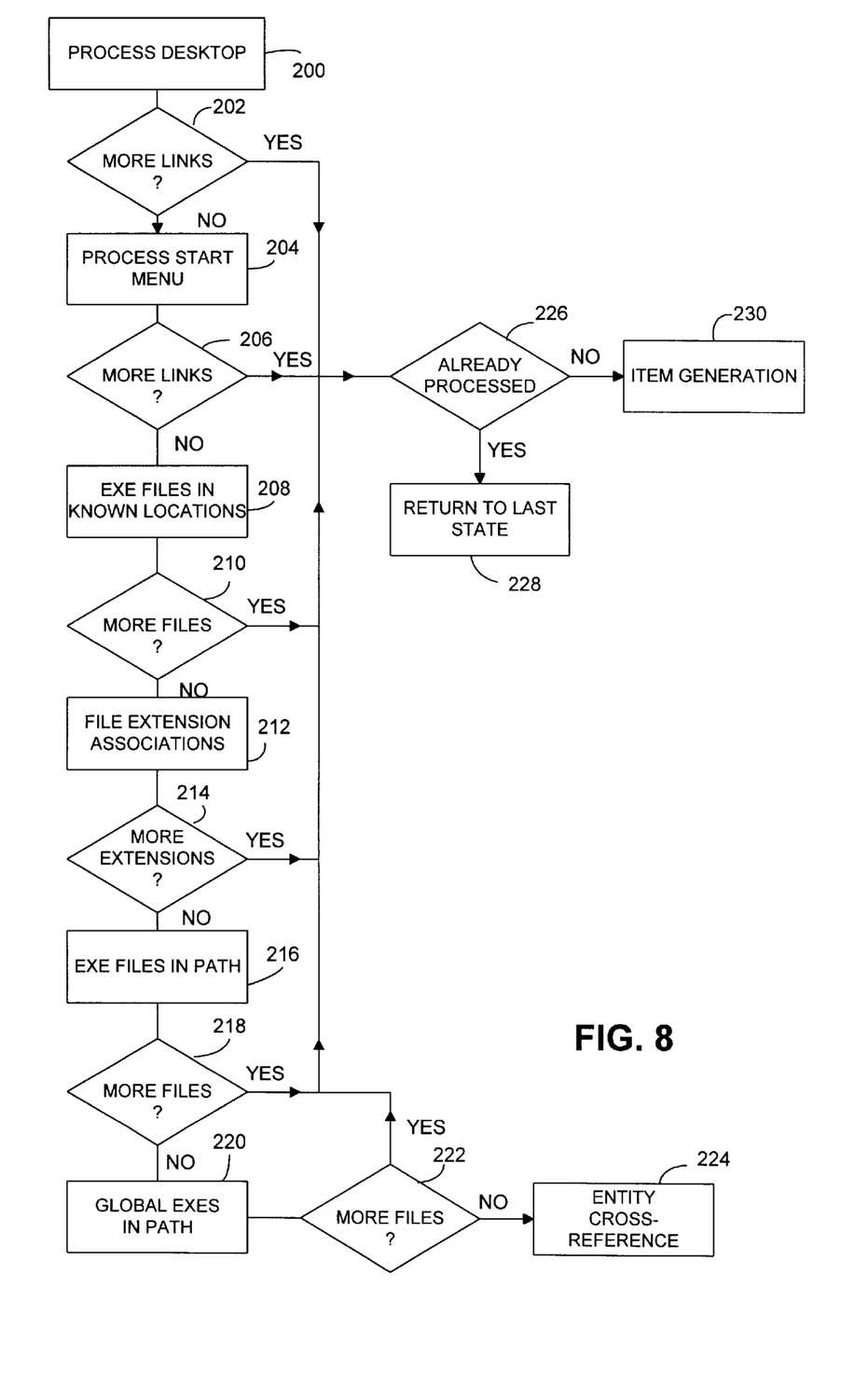
FIG. 8 is a flowchart of a process for analyzing entities on a desktop of the computer of FIG. 7.

Referring now to FIG. 8, a process 200 for analyzing an exemplary entity, in this case a desktop entity, is shown. In step 200, the process checks for links that need to be processed. If one or more links need to be processed, the process initially analyzes files associated with a "Start Menu" of the Microsoft Windows operating system (step 204). The data associated with the Start Menu provides information on software or data files commonly used by the user and is thus highly relevant to the state determination process. From step 204, the process checks whether additional links remain to be processed (step 206). If not, the process locates all executable files in known locations (step 208). Additionally, the process checks whether additional files remain to be processed (step 210). If not, the process determines file extension associations associated with the located files (step 212). From step 212, the process determines whether additional extensions remain to be processed (step 214). If not, the process determines executable files in the path (step 216). Subsequently, the process determines whether any other files remain to be processed (step 218). If not, from step 218, if no more files are to be processed, the global executables are determined (step 220) before the process checks whether more files remain to be processed (step 222). From step 222, if all files have been processed, the process proceeds to create an entity cross-reference list (step 224). Alternatively, from step 202, 206, 210, 214, 218 or 222, if an entity has been found, the process proceeds to step 226 where it checks whether that entity has been processed. If so, the process returns to the previous state (step 228). Alternatively, the process proceeds from step 226 to perform item generation in step 230.

Figure 9:
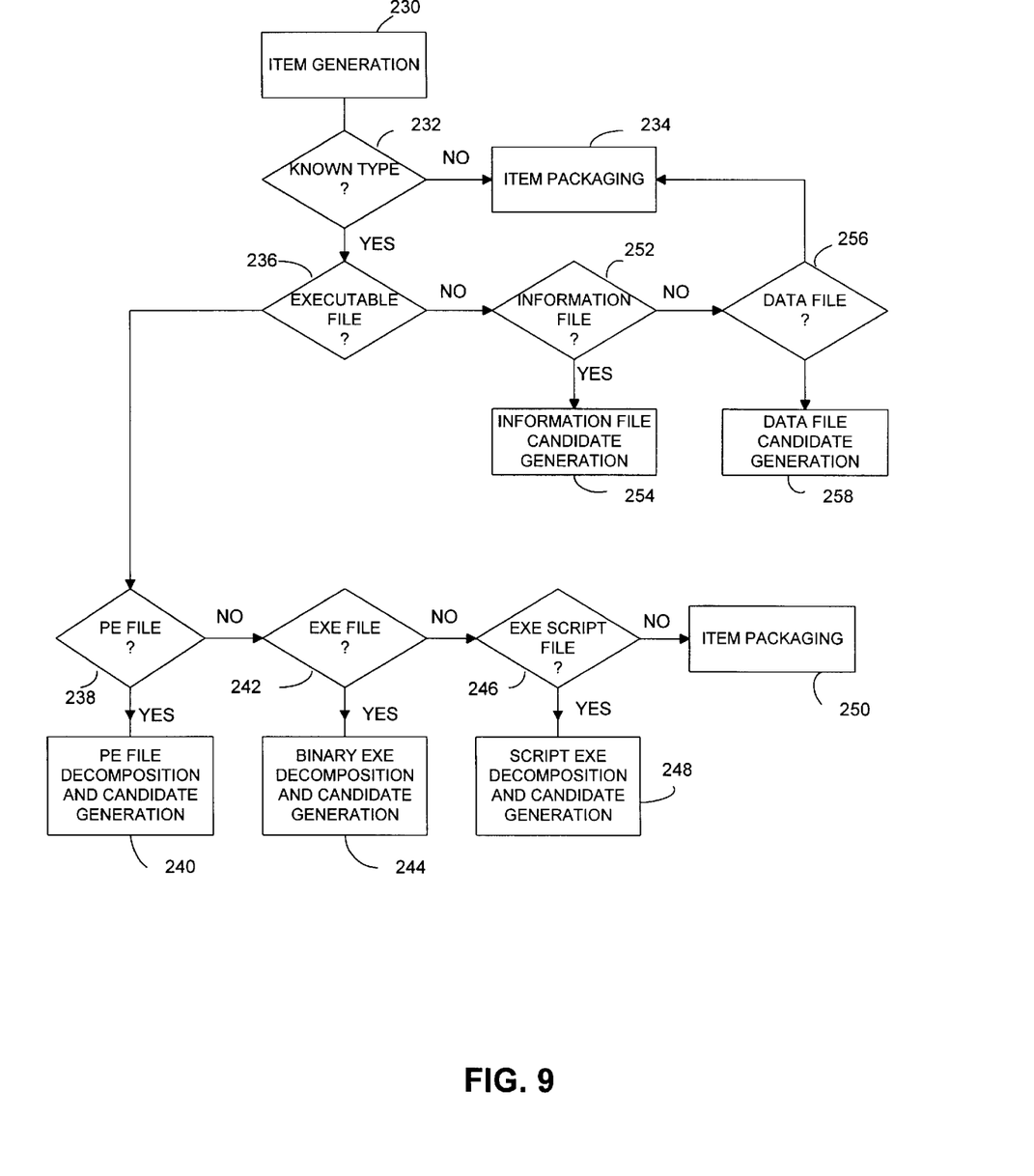
FIG. 9 is a flowchart of a process for generating items.

Referring now to FIG. 9, the item generation process 230 is shown in more detail. First, the process checks whether the item is of a known type (step 232). If not, the item is packaged (step 234). Alternatively, if the item is of a known type, the process determines whether the file is an executable file (step 236). If so, the process further determines whether the file is of a portable executable (PE) format (step 238). The PE file format is organized as a linear stream of data. It begins with an MS-DOS header, a real-mode program stub, and a PE file signature. Immediately following is a PE file header and optional header. Beyond that, all the section headers appear, followed by all of the section bodies. Sections contain the content of the file, including code, data, resources, and other executable information. Each section has a header and a body (the raw data). Sections can be organized in almost any way a linker wishes to organize them, as long as the header is filled with enough information to be able to decipher the data. Closing out the file are a few other regions of miscellaneous information, including relocation information, symbol table information, line number information, and string table data. The information in the PE file is basically high-level information that is used by the system or applications to determine how to treat the file. The first field is used to indicate what type of machine the executable was built for, such as the DEC® Alpha, MIPS R4000, Intel® x86, or some other processor. The system uses this information to determine quickly how to treat the file before going any further into the rest of the file data.

From step 238, in the event that the file is a PE file, the file is decomposed and candidates are generated (step 240). In the event that the file is not a PE file, the process checks whether the format of the file is an executable (exe) binary file (step 242). If so, the process performs a decomposition of the binary executable and also generates the candidate (step 244).

Alternatively, in step 242, if the file format is not an exe binary file format, the process proceeds to check whether the file format is an exe script format (step 246). If so, the decomposition of the script exe file and a generation of the candidate is performed (step 248). Alternatively, the process proceeds from step 246 to package the item (step 250).

In step 236, in the event a format is not an executable file format, the process checks whether the file format is an information format (step 252). If so, an information file is generated for the candidate (step 254).

In step 252, in the event that the file format is not an information file format, the process proceeds to step 256 where it checks whether the file belongs to a known data format (step 256). If so, the process performs a data file candidate generation (step 258). Alternatively, the process proceeds from step 256 to package the item (step 234). Step 234 is also performed in the event that the item is not of a known type in step 232.

Figure 10:
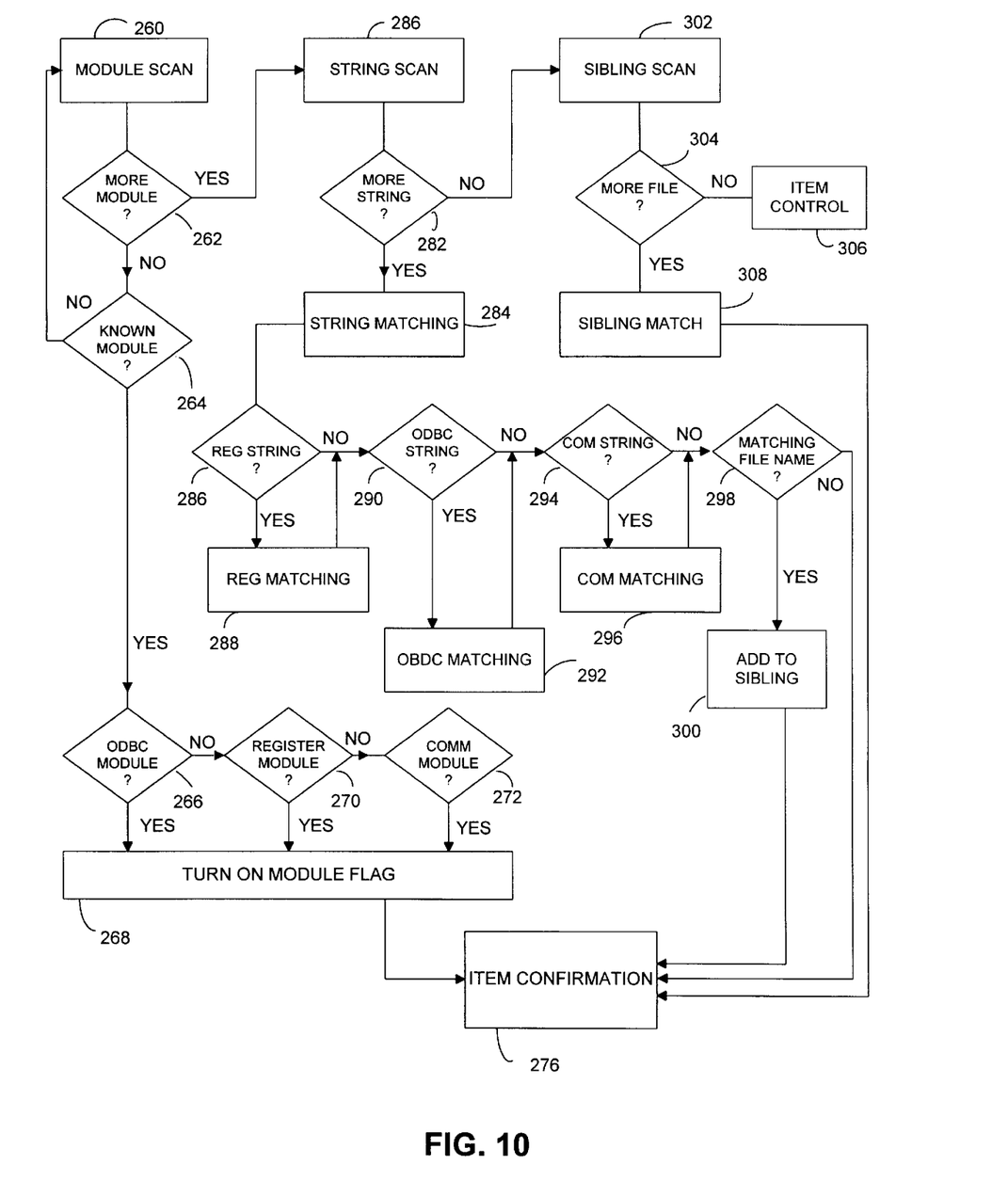
FIG. 10 is a flowchart of a process for scanning modules in conjunction with the process of FIG. 7.

Referring now to FIG. 10, the process for analyzing an item is shown. Upon entry to the process of FIG. 10, the current module is scanned for information such as the type of the module (step 260). After completing the scan of the module, the process determines whether additional modules remain to be scanned (step 262). In step 264, in the event the type is unknown, the process recursively calls the module scan process 260. If the type is known, the process proceeds to step 266 where it checks whether the module is of the type ODBC. If so, the process proceeds to turn on the appropriate module flag (step 268). Alternatively, if the module is not an ODBC module, the process proceeds to check whether the module is a registry module (step 270). If so, the appropriate module flag is turned on (step 268). From step 270, in the event the registry module is not a registry module, the process proceeds to check whether the module is a COM module (step 272). If so, the process proceeds to step 268. From step 268, the process proceeds to confirm the item in step 276.

In the event that all modules have been scanned in step 262, the process performs a string scan operation (step 280). Next, the process determines whether additional strings remain to be processed (step 282). If so, a string matching operation is performed (step 284). From the string matching operation, the process determines whether the string is of a registry type (step 286). If so, a registry matching operation is performed (step 288). From step 286 or step 288, the process proceeds to check whether the string is of an ODBC type (step 290). If so, an ODBC match operation is performed (step 292). From step 290 or step 292, the process proceeds to determine whether the string is a COM type (step 294). If so, a COM matching operation is performed in step 296. From step 294 or step 296, the process detects whether the file names match (step 298). If so, the item is added to a sibling list (300) before it proceeds to step 276 to confirm the item.

In the event that the string scan has been performed on all strings in step 282, the process proceeds to perform a sibling scan to locate related items (step 302). Next, it determines whether additional files remain to be scanned (step 304). If not, the item is confirmed in step 306. Alternatively, a sibling match operation is performed (step 308) before the item is confirmed (step 276).

As discussed above, the application state is arrived at by determining entities which provide predetermined functionalities for a user, determining items that depend from the determined entities, grouping entities by pruning overlapping entities and combining similar entities, and packaging the group of entities using a predetermined format. The system provides automatic relationship resolution based on a current machine state to enumerate in a deterministic manner fundamental data, metadata and dependencies necessary installation, synchronization, backup, recovery, analysis and repair of a computer system.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Figure 11:
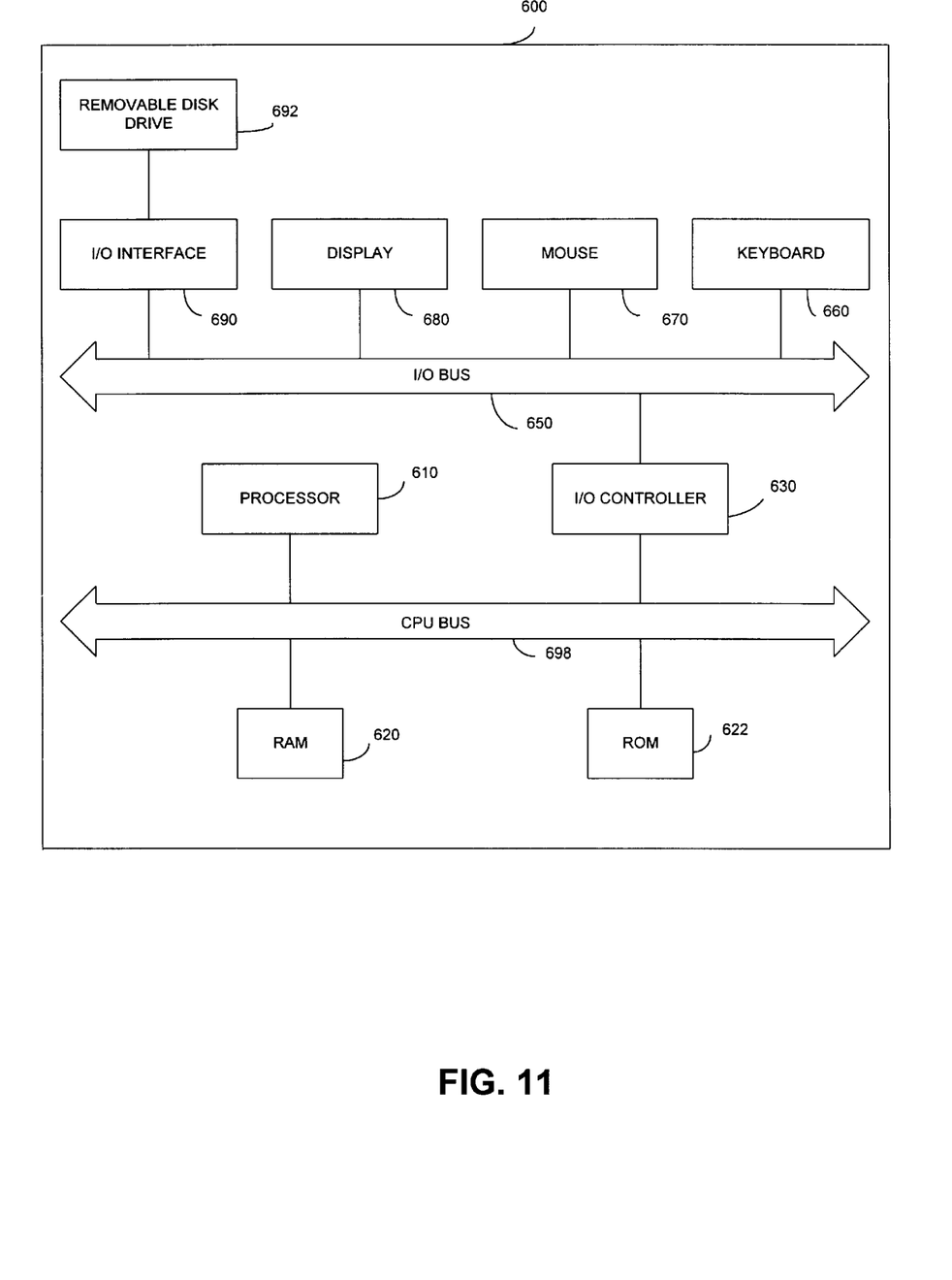
FIG. 11 is a schematic diagram of a computer containing software whose states are to be determined in accordance with the present invention.

FIG. 11 illustrates one such computer system 600, including a CPU 610, a RAM 620, and an I/O controller 630 coupled by a CPU bus 698. The I/O controller 630 is also coupled by an I/O bus 650 to input devices such as a keyboard 660 and a mouse 670, and output devices such as a monitor 680. Variations are within the scope of the following claims. For example, instead of using a mouse as the input devices, a pressure-sensitive pen or tablet may be used to generate the cursor position information.

Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A process for determining an application state for configuring a computer application having predetermined functionalities, comprising:

determining entities which provide predetermined functionalities associated with the computer application;

determining items that depend from the determined entities;

grouping entities by pruning overlapping entities and combining similar entities; and packaging the group of entities using a predetermined format.

2. The method of claim 1, wherein the determining entities further comprises:

determining tiers of user accessibility;

for each tier, enumerating root entities based on predetermined criteria; and for each enumerated entity, determining one or more dependencies of the entity.

3. The method of claim 1, wherein the item dependency determining further comprises:

generating one or more candidates;

analyzing the candidates;

confirming the candidates; and packaging items associated with the candidate.

4. The method of claim 1, wherein the entity grouping and packaging further comprises:

determining an inter-entity relationship;

eliminating any redundant relationships; and processing the entities based on the inter-entity relationship.

5. The method of claim 1, further comprising generation of one or more persistent state representations.

6. The method of claim 5, wherein the persistent state information is in a format, which further comprises:

generating zero or more information blocks; and generating one or more entity blocks.

7. The method of claim 1, wherein said application state provides a complete, persistent run-time information.

8. The method of claim 1, further comprising applying said application state in installation, synchronization, backup, recovery, analysis and repair of a computer system.

9. The method of claim 8, wherein said computer system executes a Windows operating system.

10. A method to determine an application state for installation, synchronization, backup, recovery, analysis or repair of a computer system having a Windows operating system, comprising:

determining entities which provide predetermined functionalities associated with the computer application, including:

determining tiers of user accessibility;

for each tier, enumerating root entities based on predetermined criteria; and for each enumerated entity, determining one or more dependencies of the entity;

determining dependency items, including:

generating one or more candidates;

analyzing the candidates;

confirming the candidates; and packaging items associated with the candidate; and grouping the determined root entities and packaging the entities using a predetermined format, including:

determining an inter-entity relationship;

processing the entities based on the inter-entity relationship; and placing the entities into a predetermined format.

11. A computer readable medium with instructions for determining an application state for configuring a computer application having predetermined functionalities, comprising:

code for determining entities which provide predetermined functionalities associated with the computer application;

code for determining items that depend from the determined entities;

code for grouping entities by pruning overlapping entities and combining similar entities; and code for packaging the group of entities using a predetermined format.

12. The computer readable medium of claim 11, wherein the code for determining entities further comprises:

code for determining tiers of user accessibility;

code operating on each tier to enumerate root entities based on predetermined criteria; and code operating on each enumerated entity to determine one or more dependencies of the entity.

13. The computer readable medium of claim 11, wherein the item dependency determining code further comprises:

code for generating one or more candidates;

code for analyzing the candidates;

code for confirming the candidates; and code for packaging items associated with the candidate.

14. The computer readable medium of claim 11, wherein the entity grouping code further comprises:

code for determining an inter-entity relationship;

code for eliminating redundant relationship; and code for processing the entities based on the inter-entity relationship.

15. The computer readable medium of claim 11, further comprising code for generating one or more representations of persistent state information.

16. The computer readable medium of claim 15, wherein the persistent state information is represented in a format which further comprises:

code for generating zero or one information block; and code for generating one or more entity blocks.

17. The computer readable medium of claim 11, wherein said application state provides a complete, persistent runtime information.

18. The computer readable medium of claim 11, wherein said application state is used in installation, synchronization, backup, recovery, analysis and repair of a computer system.

19. The computer readable medium of claim 18, wherein said computer system executes a Windows operating system.

20. A computer system, comprising:

a processor;

a memory array coupled to said processor;

a display coupled to said processor; and a data storage device coupled to said processor and containing a computer readable medium with codes for determining an application state for configuring the computer system with predetermined functionalities, including:

code for determining entities which provide predetermined functionalities associated with the computer application;

code for determining items that depend from the determined entities;

code for pruning overlapping entities and combining similar entities into a group; and code for packaging the group of entities using a predetermined format.

* * * * *

UNITED STATES PATENT AND TRADEMARK OFFICE
CERTIFICATE OF CORRECTION

PATENT NO. : 5,996,073
DATED : NOVEMBER 30, 1999
INVENTOR(S) : LEE ET AL.

It is certified that error appears in the above-identified patent and that said Letters Patent is hereby corrected as shown below:

On The Title page, item [56] U.S. Patent Documents, insert 5,504,879  4/1996  Eisenberg et al.  395/600

Add --FOREIGN PATENT DOCUMENTS--

0 632 371 A1  1/1995  EPO
0 458 495 A2  11/1991  EPO
0 707 264 A2  4/1996  EPO

In the OTHER PUBLICATIONS
Insert:

Gulla et al., "Change-oriented version descriptions in EPOS", Software Engineering Journal no. 6, 11/1991, 378-386.

Signed and Sealed this

Twenty-ninth Day of August, 2000

Attest:

Q. TODD DICKINSON

Attesting Officer    Director of Patents and Trademarks